United States Patent [19]

Miller et al.

[11] Patent Number: 4,698,738

[45] Date of Patent: Oct. 6, 1987

[54] PARALLEL CONNECTED POWER SUPPLIES HAVING PARALLEL CONNECTED CONTROL CIRCUITS WHICH EQUALIZE OUTPUT CURRENTS TO A LOAD EVEN AFTER ONE SUPPLY IS TURNED OFF

[75] Inventors: John A. Miller, San Diego; James D. Walker, Escondido, both of Calif.

[73] Assignee: Unisys Corporation, Detroit, Mich.

[21] Appl. No.: 934,025

[22] Filed: Nov. 24, 1986

[51] Int. Cl.$^4$ .............................................. H02M 7/04
[52] U.S. Cl. .......................................... 363/65; 307/58; 323/268; 363/70; 363/71; 364/200
[58] Field of Search ................... 307/45, 58; 363/65, 363/69, 70, 71; 323/268

[56] References Cited

U.S. PATENT DOCUMENTS

| | | | |
|---|---|---|---|
| 3,549,977 | 12/1970 | Watkins | 363/71 |
| 4,039,925 | 8/1977 | Fletcher | 363/70 |
| 4,150,425 | 4/1979 | Frosh | 363/71 |
| 4,270,165 | 5/1981 | Carpenter et al. | 363/65 |
| 4,425,613 | 1/1984 | Shelly | 363/71 |
| 4,635,178 | 1/1987 | Greenhalgh | 363/65 |

*Primary Examiner*—William H. Beha, Jr.
*Attorney, Agent, or Firm*—Charles J. Fassbender; L. Joseph Marhoefer

[57] ABSTRACT

A power supply system comprises several power supplies, each of which has output terminals that are coupled in parallel to supply respective DC output currents at the same time to a single load. Each power supply also has a branch of a control circuit, and each branch from every supply is coupled in parallel to thereby form a complete control circuit. In these branches, control currents flow that cause the respective output currents from the several power supplies to equalize. Each power supply also has a circuit for automatically turning the supply off independent of the other power supplies when a component in the supply fails; and under such conditions, a switch in the control circuit branch of the failing supply automatically opens which prevents control current from flowing therein and enables the remaining supplies to share the added load.

10 Claims, 5 Drawing Figures

PARALLEL CONNECTED POWER SUPPLIES HAVING PARALLEL CONNECTED CONTROL CIRCUITS WHICH EQUALIZE OUTPUT CURRENTS TO A LOAD EVEN AFTER ONE SUPPLY IS TURNED OFF

BACKGROUND OF THE INVENTION

This invention relates to power supplies that furnish DC voltages and DC currents to integrated circuits in data processing apparatus such as computers and peripherals; and more particularly, it relates to systems of several intercoupled power supplies which operate in parallel in furnishing the DC current.

Basically, a power supply of the above type receives AC power from a wall outlet, and it converts that AC input power to DC output power. In one typical power supply, the Ac input power is at 208 volts and 60 Hz, while the DC output power is at 5 volts. Each power supply has a maximum power rating which determines how much current it can furnish and still maintain the DC voltage within a certain regulation band. For example, a 1500 watt, 5 volt power supply can furnish up to 300 amps and still maintain a 5 volt DC output voltage.

Frequently, DC power is furnished to the circuits of data processing apparatus by just one large power supply. However, a system of several small power supplies operating in parallel can also be employed. Suppose, for example, that the data processing apparatus requires 4500 watts at 5 volts. This can be achieved by one 4500 watt, 5 volt power supply which furnishes 900 amps, or it can be achieved by a system of three 1500 watt, 5 volt power supplies which operate in parallel and furnish 300 amps each.

If a single large power supply is used, then the total number of power supply parts will generally be minimized. Also, the total number of connections which need to be made in order to install the power supply in the data processing apparatus will generally be minimized.

But when a system of several small power supplies is used, the individual supplies can be arranged to fit into differently shaped spaces within the data processing apparatus. Also, it generally is easier to circulate air through several small power supplies rather than one large power supply, and thus cooling the smaller power supplies may be easier. Further, with small power supplies, it generally is easier to shorten the distance which large currents must travel; and thus it is easier to reduce inductive noise in the power supplies' output voltage.

One problem, however, with systems of paralleled power supplies in the prior art is that individual supplies in the system could not be separately turned off and turned back on without causing the DC output voltage of the system to go outside of its regulation band. But such a feature is very desirable because it enables any one power supply in the system to become defective, to be automatically turned off, to be replaced, and to be turned back on without ever stopping the operation of the data processing apparatus.

Accordingly, a primary object of the invention is to provide a system of parallel power supplies in which the above problem is overcome.

BRIEF SUMMARY OF THE INVENTION

A power supply system which is constructed according to the invention comprises: a plurality of power supplies having respective output terminals which are coupled in parallel to supply respective DC output currents at the same time; each power supply has a branch of a control circuit which includes a voltage generator for generating a control voltage which is proportional to the respective output current from the power supply, and a resistor in series with the voltage generator; each power supply has its control circuit branch coupled in parallel with the control circuit branches of the remaining power supplies to thereby form a complete control circuit in which respective control currents flow in response to any imbalance in the control voltage in the respective power supplies; each power supply also includes a circuit for adjusting the magnitude of its respective output current as a function of the respective control current through the resistor in its control circuit branch; each power supply also forms a signal for turning the supply on and off independent of the other power supplies; and, each power supply further includes an automatically operated electronic switch in its control circuit branch for automatically enabling control current to flow therein only when the power supply is on.

BRIEF DESCRIPTION OF THE DRAWINGS

Various features and advantages of the invention are described herein in conjunction with the accompanying drawings wherein:

FIG. 3 illustrates several currents and voltages which occur in the power supply system of FIG. 1 when one of the supplies of that system is turned off and subsequently is turned back on;

DETAILED DESCRIPTION OF THE INVENTION

Figure 1:
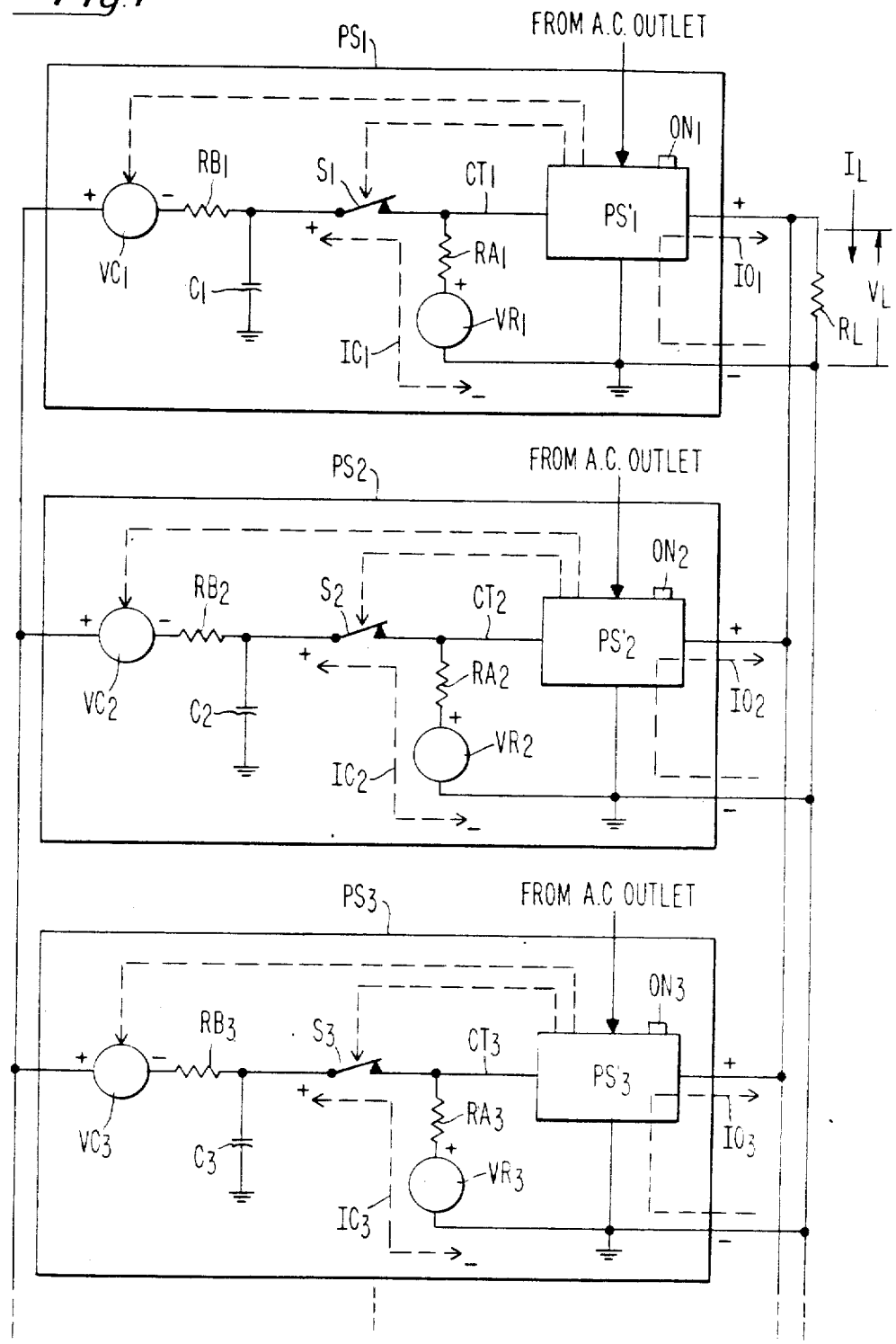
FIG. 1 illustrates a preferred embodiment of a power supply system which is constructed in accordance with the invention.

Referring now to FIG. 1, a preferred embodiment of a power supply system which is constructed according to the invention will be described in detail. This particular power supply system includes three power supplies which are labeled $PS_1$, $PS_2$, and $PS_3$. As an alternative, however, the system can include any number of power supplies as indicated by the dots (....) at the bottom of FIG. 1.

Each power supply in the system has a pair of output terminals, and they are indicated in the righthand side of FIG. 1 by a plus and minus sign. These terminals are coupled in parallel and simultaneously supply respective DC output currents to an external load $R_L$. Power supplies $PS_1$, $PS_2$, and $PS_3$ respectively supply output currents $IO_1$, $IO_2$, and $IO_3$; and those currents together form a load current $I_L$ which produces a DC voltage drop $V_L$ across the external load.

Each power supply further includes one branch of a control circuit. In power supply $PS_1$, the control circuit branch comprises several components which are labeled $RA_1$, $VC_1$, $RB_1$, $C_1$, $S_1$, and $VR_1$. These components are interconnected as illustrated; and, as described hereafter in conjunction with FIGS. 2 and 3, they regulate the amount of output current $IO_1$.

Similarly, in power supply $PS_2$, the control circuit branch comprises components $RA_2$, $VC_2$, $RB_2$, $C_2$, $S_2$, and $VR_2$. And in power supply $PS_3$, the control circuit branch comprises components $RA_3$, $VC_3$, $RB_3$, $C_3$, $S_3$, and $VR_3$. Here again these components are interconnected as illustrated, and they regulate the amount of output current which the corresponding power supply furnishes to the external load $R_L$.

Components $RA_1$, $RA_2$, and $RA_3$ are resistors, and a suitable value for each of them is 24.9K ohms. Components $RB_1$, $RB_2$, and $RB_3$ are resistors, and a suitable value for each of them is 49.9K ohms. Components $C_1$, $C_2$, and $C_3$ are capacitors; and a suitable value for each of them is 0.1 microfarad. Components $VR_1$, $VR_2$, and $VR_3$ are reference voltage generators, and they each generate a fixed reference voltage, such as 5 volts.

Components $VC_1$, $VC_2$, and $VC_3$ are control voltage generators. They each generate a control voltage which varies in proportion to the respective output current from the corresponding power supply. A preferred embodiment for each voltage generator is described hereafter in conjunction with FIG. 4.

Components $S_1$, $S_2$, and $S_3$ are electrically operated switches. They each enable a respective control current $IC_1$, $IC_2$ and $IC_3$ to flow through a control circuit branch when the corresponding power supply is on, and they inhibit the respective control current from flowing through the control circuit branch when the corresponding power supply is off. A preferred embodiment for each switch is described hereafter in conjunction with FIG. 5.

All of the remaining components of each of the power supplies $PS_1$, $PS_2$, and $PS_3$ are contained within respective modules labeled $PS_1'$, $PS_2'$, and $PS_3'$. Included in each module is circuitry for manually turning the power supply on, and circuitry for manually and automatically turning the power supply off. This circuitry will be described further in conjunction with FIGS. 4 and 5.

Also respectively included in the modules $PS_1'$, $PS_2'$, and $PS_3'$ are control terminals labeled $CT_1$, $CT_2$, and $CT_3$. These terminals are connected to the control circuit branches as illustrated. In operation, each module compares the voltage on its control terminal to the load voltage $V_L$; and it increases its output current if the load voltage is lower than the control terminal voltage, and decreases its output current if the load voltage is higher than the control terminal voltage.

That control terminal voltage is dependent upon the control currents $IC_1$, $IC_2$ and $IC_3$ which flow in the control circuit branches. Specifically, the voltage on control terminal $CT_1$ equals the reference voltage $VR_1$ plus or minus the quantity $(IC_1)(RC_1)$. Similarly, the control voltage on terminal $CT_2$ equals the reference voltage $VR_2$ plus or minus the quantity $(IC_2)(RC_2)$; and the voltage on control terminal $CT_3$ equals the reference voltage $VR_3$ plus or minus the quantity $(IC_3)(RC_3)$.

Each power supply has its control circuit branch coupled in parallel with the control circuit branches of the remaining power supplies. This forms a complete control circuit in which the respective control currents $IC_1$, $IC_2$ and $IC_3$ flow. These currents have a magnitude and direction which is determined by any imbalance in the control voltages $VC_1$, $VC_2$, and $VC_3$ /.

Figure 2:
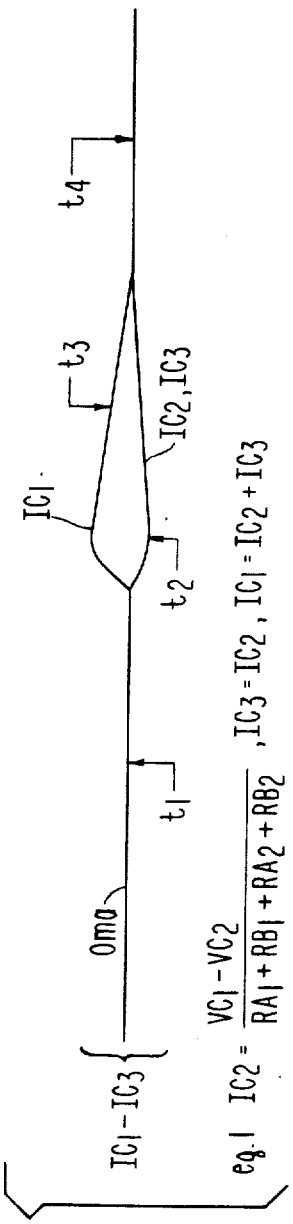
FIG. 2 illustrates various control currents which flow in the power supply system of FIG. 1 while that system is operating.

Under ideal operating conditions, each power supply furnishes the same amount of output current to the external load. Consequently, the control voltages $VC_1$, $VC_2$, and $VC_3$ are all zero. This is shown in FIG. 2 as occurring at time $t_1$.

Suppose now that output current $IO_1$ from supply $PS_1$ increases and becomes larger than output currents $IO_2$ and $IO_3$. When that occurs, the voltage from control voltage generator $VC_1$ will be larger than the voltage from the control voltage generators $VC_2$ and $VC_3$.

Due to this imbalance in the control voltages, current $IC_1$ will flow in a positive direction through the control circuit branch of supply $PS_1$; current $IC_2$ will flow in a negative direction through the control circuit branch of supply $PS_2$; and current $IC_3$ will flow in a negative direction through the control circuit branch of supply $PS_3$. This is shown in FIG. 2 as occurring at time $t_2$. Mathematical expressions for the magnitudes of the currents $IC_1$, $IC_2$, and $IC_3$ are also given in FIG. 2 by equation 1.

As current $IC_1$ flows through the control circuit branch of supply $PS_1$, it produces a voltage drop across resistor $RC_1$ which lowers the voltage on terminal $CT_1$. Thus the output current $IO_1$ from power supply $PS_1$ is reduced. This in turn lowers the voltage from control voltage generator $VC_1$, and that reduces the imbalance in the control voltages.

At the same time, control currents $IC_2$ and $IC_3$ in power supplies $PS_2$ and $PS_3$ produce respective voltage rises in control terminals $CT_2$ and $PS_3$ increase their respective output currents $IO_2$ and $IO_3$. This in turn increases the voltages from control voltage generators $VC_2$ and $VC_3$, and that further reduces the imbalance in the control voltages.

As the imbalance in the control voltages is reduced, the magnitudes of the control currents are also reduced. This is shown in FIG. 2 as occurring at time $t_3$. Such reduction continues to occur until, as shown at time $t_4$, currents $IC_1$, $IC_2$, and $IC_3$ are again returned to zero.

Figure 3:
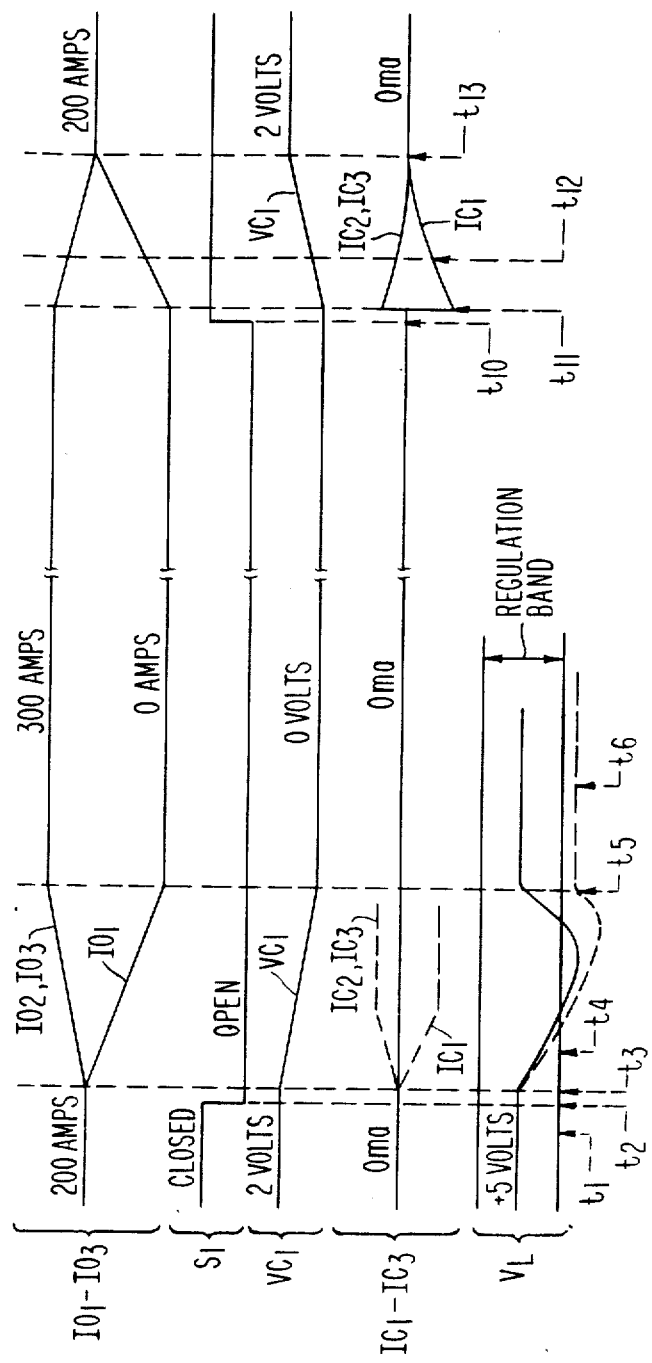

Consider now how the power supply system operates when one of the power supplies is turned off while the remaining power supplies are left on. This operation is illustrated in FIG. 3. Such a turning off of one power supply can, for example, be initiated automatically by the detection of an output overvoltage condition that is caused by a component failure within the supply.

Initially, as shown at time $t_1$ in FIG. 3, all of the power supplies are on; and they each are delivering equal amounts of output current to the external load. Subsequently, at time $t_2$, power supply $PS_1$ is turned off; and as an immediate response, the electrically operated switch $S_1$ opens. This inhibits may control current $IC_1$ from flowing through the turned off power supply.

Shortly thereafter, the output current $IO_1$ and the voltage from generator $VC_1$ both decay in a ramped fashion to zero. This is shown as starting to occur at time $t_3$. Due to the rampdown of current $IO_1$, the voltage $V_L$ across the external load starts to decrease. Also, due to the rampdown of voltage generator $VC_1$, a voltage imbalance occurs in the respective control voltage branches.

This voltage imbalance tends to generate control current $IC_1$ in a negative direction and generate control currents $IC_2$ and $IC_3$ in a positive direction. This is shown by the dashed lines in FIG. 3 at time $t_4$. However, since switch $S_1$ is open, each of the control currents $IC_1$, $IC_2$, and $IC_3$ stay at zero as indicated by the solid line at time $t_4$.

As the load voltage $V_L$ drops, it becomes less than the voltage at the control terminals $CT_2$ and $CT_3$. Consequently, the power supplies $PS_2$ and $PS_3$ increase their respective output currents $IO_2$ and $IO_3$, and this restores the load voltage $V_L$ to its regulated value. This sequence is illustrated in FIG. 3 as occurring between times $t_3$ and $t_5$.

To further appreciate the significance of the switches $S_1$, $S_2$, and $S_3$ in the above power-off sequence, suppose now that they are not included in the power supply system. In that case, the control currents $IC_1$, $IC_2$, and $IC_3$ will flow as shown by the dashed lines beginning at time $t_3$. Currents $IC_2$ and $IC_3$ will generate respective voltage drops across resistors $RC_2$ and $RC_3$, and that will lower the voltage on the control terminals $CT_2$ and $CT_3$.

As a result, the output currents $IO_2$ and $IO_3$ will be reduced until the load voltage $V_L$ equals the lowered voltage on the control terminals $CT_2$ and $CT_3$. In other words, the load voltage $V_L$ will be forced to a level below the reference voltage and may even be outside of a predetermined regulation band. This is indicated in FIG. 3 by the dashed line at time $t_6$.

Consider now the signal sequence that occurs when the switches $S_1$, $S_2$, and $S_3$ are in place, the defective component in power supply $PS_1$ has been repaired, and power supply $PS_1$ is manually turned back on. That signal sequence is illustrated in the righthand half of FIG. 3. Initially, as shown at time $t_{10}$, switch $S_1$ closes as an immediate response to power supply $PS_1$ being turned on. That in turn allows the control current $IC_1$ to flow. Current $IC_1$ will be negative and currents $IC_2$ and $IC_3$ will be positive since the voltage across generator $VC_1$ is initially zero. This is illustrated as occurring at time $t_{11}$.

Control current $IC_1$ causes the voltage on control terminal $CT_1$ to rise. Consequently, output current $IO_1$ begins to ramp up. At the same time, control currents $IC_2$ and $IC_3$ respectively decrease the voltage on control terminals $CT_2$ and $CT_2$; and thus the output currents $IO_2$ and $IO_3$ begin to ramp down. This is shown in FIG. 3 as occurring at time $t_{12}$.

As the output current $IO_1$ increases, the voltage across generator $VC_1$ also increases; and as the output currents $IO_2$ and $IO_3$ decrease, the voltages across generators $VC_2$ and $VC_3$ decrease. This action continues until all of the output currents $IO_1$, $IO_2$, and $IO_3$ are equal to each other. At that time, the control voltages $VC_1$, $VC_2$, and $VC_3$ are in balance and so the control currents $IC_1$, $IC_2$, and $IC_3$ are reduced to zero. This is shown as occurring at time $t_{13}$.

Figure 4:
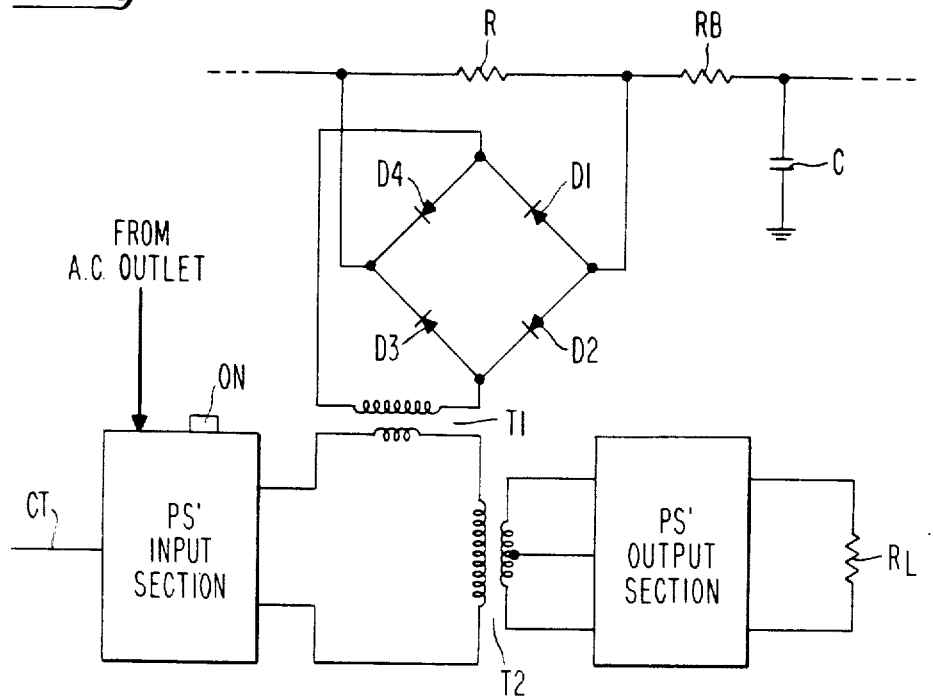
FIG. 4 is a detailed circuit diagram of a control voltage generator in the power supply system of FIG. 1.

Turning now to FIG. 4, additional details of a preferred embodiment of each of the control voltage generators $VC_1$, $VC_2$ and $VC_3$ will be described. this embodiment includes four diodes D1, D2, D3 and D4, a resistor R, and a current transformer T1. All of these components are interconnected as illustrated. Suitably, resistor R has a resistance of 20 ohms.

As shown in FIG. 4, the primary side of transformer T1 is coupled in series with the primary side of a power transformer T2 which lies within power supply module PS'. That power transformer T2 separates module PS' into an input section and an output section. In operation, the input section receives AC power from a wall outlet at 60 Hz and converts that power to a higher frequency across transformer T2; and the output section receives the high frequency power and converts it to DC power for the external load $R_L$. For example, the input section receives 208 volts at 60 Hz and converts it to 150 volts at 20 KHz; and the output section converts the 20 KHz power to 5 volts DC.

That higher frequency current through the primary of transformer T2 has a variable duty cycle. Specifically, the currents pulse width is increased when the output voltage is lower than the voltage on the control terminal CT, and vice versa. Suitably, this is achieved by a TDA 4700 control chip from Siemens.

Transformer T1 has fewer turns in its primary than in its secondary; and transformer T2 has more turns in its primary than in its secondary. Suitably, transformer T1 has a primary-secondary turns ratio of 1:200; and transformer T2 has a primary-secondary turns ratio of 10:1. Thus, when a current of 200 amps flows through the secondary of transformer T2, a current of only 100 milliamps flows in the secondary of transformer T1. And when a current of 300 amps flows through the secondary of transformer T2, a current of only 150 milliamps flows through the secondary of transformer T1.

That current which flows through the secondary of transformer T1 is rectified by the diodes D1–D4 such that it flows in one direction (from left to right) through resistor R. Thus a voltage is generated across resistor R which is a measure of the current which the power supply delivers to the external load. Resistors RA, RB, and capacitor C operate to filter this voltage and retain its DC component. With the above described turns ratio, this voltage across resistor R is 1:0 volts per 100 amps of output current.

Figure 5:
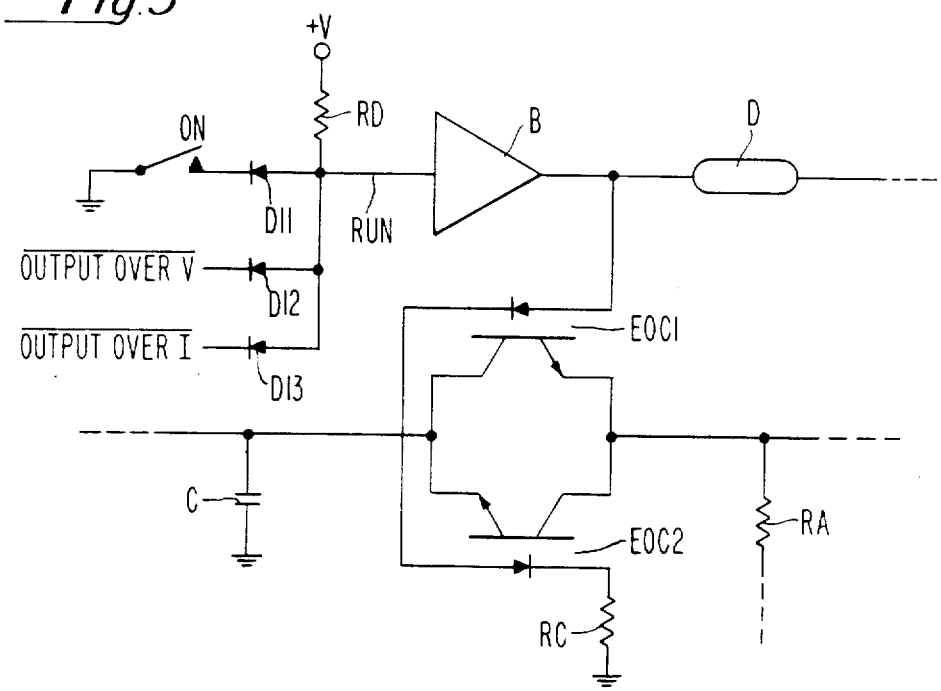
FIG. 5 is a detailed circuit diagram of an automatically activated electronic switch which is included within the power supply system of FIG. 1.

Next, reference should be made to FIG. 5 wherein a preferred embodiment of each of the electronically controlled switches $S_1$, $S_2$, and $S_3$ is shown. This embodiment includes a pair of electro-optical couplers EOC1 and EOC2, a pair of resistors RC and RD, a buffer B, a delay network D, a mechanical power-on switch ON, and three diodes D11 through D13. All of these components are interconnected as FIG. 5 illustrates.

When the power supply is manually turned on, the power-on switch ON is in an open position. Also, if the power supply is not defective, all of the signals to the diodes D12 and D13 are true or high. This combination causes the RUN signal to be at high voltage +V. Thus, buffer B causes a current to flow through the diode portion of the electro-optical couplers EOC1 and EOC2. As a result, the transistor portions of those couplers become conductive, and that enables the previously described control currents $IC_1$, $IC_2$, and $IC_3$ to pass through them.

Conversely, when the power supply is manually turned off, the power-on switch ON is closed. This causes the RUN signal to be at a low voltage. Thus the output of buffer B also goes to a low voltage, and that stops any current from flowing through the diode portion of the electro-optical couplers EOC1 and EOC2. In response, the transistor portions of those electro-optical couplers become nonconductive and prevent the control currents $IC_1$, $IC_2$ and $IC_3$ from flowing.

Similarly, when the power supply is turned off automatically, the RUN signal will be forced low. For example, if a component failure in the power supply causes the DC output voltage to get too high, then signal $\overline{OUTPUTOVERV}$ goes low which forces the RUN signal low. In like manner, signal $\overline{OUT\ PUTOVER1}$ will go low and force signal RUN low if a component failure in the supply causes the DC output current to get too large.

All high and low voltages from the output of buffer B are delayed by the delay network D. Preferably, this delay is in the range of ten microseconds to ten milliseconds. Those delayed high and low voltages from delay network D are generated as a control signal which is used within the PS' input section to respectively enable and disable the high frequency AC power from being applied to the primary winding of transformer T2. Consequently, the switch always opens before the power supply turns off, and the switch closes before the power supply turns on.

A preferred embodiment of the invention has now been described in detail. In addition, however, many changes and modifications can be made to these details without departing from the nature and spirit of the invention. For example, the electro-optical couplers EOC1 and EOC2 in the FIG. 5 switch may be replaced with an electro-mechanical relay whose coil is energized by the signal from buffer B and whose contacts pass/stop the control current. Alternatively, couplers EOC1 and EOC2 may be replaced with a pair of field effect transistors, one of which is P-channel and the other of which is N-channel, that are coupled to pass/stop the control current in parallel. Buffer B's output signal is coupled to the gate of the N-channel transistor, and the complement of that signal is coupled to the gate of the P-channel transistor. Accordingly, since many such changes may be made, it is to be understood that the invention is not limited to the above details but is defined by the appended claims.

What is claimed is:

1. A power supply, for use in parallel with other power supplies, to furnish a respective output current to an external load; said power supply including: a control circuit branch for carrying a control current, and a means for adjusting the magnitude of said output current as a function of said control current through said control circuit branch; said control circuit branch including a pair of terminals for coupling said control circuit branch in parallel to similar control circuit branches in said other power supplies; said power supply also having a means for turning the supply on and off independent of the other power supplies; and, said control circuit branch further including a switch means for automatically inhibiting said control current through said control circuit branch when said power supply is off and enabling said control current through said control circuit branch when said power supply is on.

2. A power supply system comprising: a plurality of power supplies having respective output terminals which are coupled in parallel to supply respective output currents at the same time to an external load; each power supply having a branch of a control circuit which includes a voltage generator means for generating a control voltage which is proportional to said respective output current from the power supply, and a resistor means in series with the voltage generator means; each power supply having its control circuit branch coupled in parallel with the control circuit branches of the remaining power supplies to thereby form a complete control circuit in which respective control currents flow in response to any imbalance in said control voltage in the respective power supplies; each power supply including a means for adjusting the magnitude of its respective output current as a function of said respective control current through said resistor in its control circuit branch; each power supply also having a means for turning the supply on and off independent of the other power supplies; and, each power supply further including an automatically operated electronic switch means in its control circuit branch for automatically enabling said control current to flow therein only when the power supply is on.

3. A power supply system according to claim 2 wherein said switch means, in each control circuit branch, includes: a means for generating a signal having first and second voltage states which respectively indicate when said power supply is on and when said power supply is off; and, a transistor means which responds to said first state by passing said control current and responds to said second state by stopping said control current.

4. A power supply system according to claim 3 wherein said transistor means is coupled to receive and respond to said digital signal through an optical medium.

5. A power supply system according to claim 4 wherein said transistor means turns off to stop said control current before said control voltage from said voltage generator starts to decrease when said power supply turns off.

6. A power supply system according to claim 5 wherein said transistor means turns on to pass said control current before said control voltage from said voltage generator starts to increase when said power supply turns on.

7. A power supply system comprising: a plurality of power supplies having respective output terminals which are coupled in parallel to supply respective output currents at the same time to an external load; each power supply including a branch of a control circuit for carrying a respective control current, and each power supply being adapted to adjust the magnitude of said respective output current from the power supply as a function of said control current; each power supply having its control circuit branch coupled in parallel with the control circuit branches of the remaining power supplies to thereby form a complete control circuit in which said control currents flow through the respective branches; each power supply also having a means for turning the supply on and off independent of the other power supplies; and each power supply further including a switch means in its control circuit branch for automatically enabling said control current to flow therein when the power supply is on but not when the power supply is off.

8. A power supply system according to claim 7 wherein said switch means, in each control circuit branch, includes: a means for generating a signal having first and second skates which respectively indicate when said power supply is on and when said power supply is off; and, a means which responds to said first state to pass said control current and responds to said second state to stop said control current.

9. A power supply system according to claim 7 wherein said switch means, in each control circuit branch, inhibits said control current from flowing therein at least 10 microseconds before the output current from the corresponding power supply decreases when that power supply is turned off.

10. A power supply system according to claim 7 wherein each control circuit branch includes a voltage generator means for generating a control voltage which is proportional to said respective output current from the power supply, and wherein said switch means opens before said control voltage from said voltage generator starts to decrease when said power supply turns off.

* * * * *